United States Patent [19]

Dyer et al.

[11] 4,293,065

[45] Oct. 6, 1981

[54] DRIVE/TAKE-UP ASSEMBLY FOR ACCUMULATING LIVE ROLLER CONVEYOR SYSTEMS

[75] Inventors: Thomas A. Dyer, Greenwood; Richard L. Huelster, Indianapolis, both of Ind.

[73] Assignee: Pentek Corporation, Indianapolis, Ind.

[21] Appl. No.: 144,236

[22] Filed: Apr. 28, 1980

[51] Int. Cl.³ .................. B65G 13/07; B65G 15/20
[52] U.S. Cl. ............................... 198/781; 198/790; 198/809
[58] Field of Search .............. 198/781, 790, 809, 816

[56] References Cited

U.S. PATENT DOCUMENTS

| | | | |
|---|---|---|---|
| 3,062,359 | 11/1962 | McGow et al. | 198/809 |
| 3,420,355 | 1/1969 | De Good et al. | 198/781 |
| 3,612,248 | 10/1971 | Wallis | 198/781 |
| 4,088,224 | 5/1978 | Kittredge | 198/790 X |
| 4,149,626 | 4/1979 | Holt | 198/809 X |

*Primary Examiner*—Jeffrey V. Nase
*Attorney, Agent, or Firm*—Jenkins, Coffey, Hyland, Badger & Conard

[57] ABSTRACT

An accumulating live roller conveyor is power-driven to effect rotation of a plurality of load-carrying rollers and transport loads from roller to roller without gravity assistance and includes apparatus which is specifically designed to permit loads to remain stationary on the load-carrying rollers without interferring with the operation of the conveyor's drive mechanism. The drive mechanism includes an endless conveying member having an upper frictional driving pass and a lower return pass for transporting the loads along the load-carrying rollers through friction contact therewith. A drive/take-up assembly section for an accumulating live conveyor system permits the loads to selectively remain stationary in conveyor zones located at the ends of the conveyor which typically include drive/take-up rollers and a drive motor without interferring with the operation of the drive/take-up rollers or the drive motor. The drive/take-up assembly section includes inner frame members for rotatably carrying the drive/take-up roller which are pivotally movable relative to the load-carrying rollers, and a pneumatically operable jack for raising and lowering the inner frame members, the drive/take-up roller, and at least the upper frictional driving pass of the conveying member to selectably and independently accumulate the loads in the conveyor zones adjacent the drive/take-up assemblies.

20 Claims, 7 Drawing Figures

DRIVE/TAKE-UP ASSEMBLY FOR ACCUMULATING LIVE ROLLER CONVEYOR SYSTEMS

The present invention relates to live conveyor systems which are power-operated to effect transportation of loads over a series of rollers from an upstream end to a downstream end of the conveyor system without gravity assistance. More particularly, the present invention relates to improvements in the drive/take-up assemblies of such conveyor system to effect accumulation of the loads in the drive/take-up zones of the conveyor system without interference with the operation of the conveyor's power source.

Accumulating live conveyor systems are generally well known to those skilled in the art, as exemplified by the conveyor systems disclosed in U.S. Pat. Nos. 3,062,359; 3,643,788; and 4,149,626. Of these conveyor systems, those disclosed in U.S. Pat. Nos. 3,062,359 and 4,149,626 are more closely related to the live conveyor systems and improvements thereto of the present invention. These two conveyor systems employ an endless driving or conveying means having an upper power-delivering pass in frictional driving contact with the load being transported and a lower return pass. A drive assembly located at one end of the conveyor system includes means for propelling the endless driving means and a take-up assembly located at the other end of the conveyor system includes means for tensioning the endless driving means. Each of these two conveyor systems includes means specifically designed to raise and lower the upper power-delivering pass of the endless driving means to permit the loads to be accumulated on the conveyor in selected zones and remain stationary without interference with the operation of the endless driving means or propelling means.

One of the problems associated with accumulating live conveyor systems, such as those exemplified in the disclosures of U.S. Pat. Nos. 3,062,359 and 4,149,626, is the inability to selectively transport or accumulate the loads at the ends of the conveyor where the drive and take-up assemblies are located. Heretofore, the propelling means and the tensioning means have been fixed in the drive and take-up assemblies, respectively, so that they are incapable of being raised and lowered to allow either transportation or accumulation within their respective conveyor zones. Accordingly, while loads could be accumulated within conveyor zones located intermediate to the ends of the conveyor systems, the loads could not be selectively accumulated at the conveyor ends unless the propelling means was stopped.

It is therefore one object of the present invention to provide an accumulating live conveyor system wherein loads can be selectively accumulated at the ends of the conveyor system without necessitating stoppage of the endless driving means or the means for propelling the endless driving means.

It is a further object of the present invention to provide an accumulating assembly section for a live conveyor system which is interchangeably adaptable for use as a drive assembly section or a take-up assembly section and which therefore allows independent raising and lowering of the propelling means and/or the tensioning means and selected portions of the endless driving means adjacent the respective ends of the live conveyor system without interferring with the operation of the endless driving means.

According to the present invention, the accumulating drive/take-up assembly section includes laterally spaced outer support members for supporting a plurality of load-carrying rollers for rotation about transverse axes which are suitably spaced apart and arranged in a common load-transporting array in the longitudinal direction of the conveyor, inner frame members for rotatably supporting drive means or take-up means which engages and propels the endless conveying means, means for mounting the inner frame members to a portion of the outer support members to provide a fulcrum for movement of the inner frame members relative to the load-carrying rollers, laterally spaced inner support members for carrying the upper frictional driving pass and the lower return pass of the endless conveying means, means for mounting the inner support members to the portion of the outer support members to provide a fulcrum for movement of the inner support members relative to the load-carrying rollers independent of movement of the inner frame members.

Further according to the present invention, an accumulating live conveyor system includes a plurality of assembly sections; a first end section including means for driving an endless conveying means, an accumulating drive assembly frame for supporting the driving means and the endless conveying means, means for mounting the drive assembly frame within the first end section for movement relative to load-carrying rollers supported thereby, and first independently operable jack means for raising and lowering at least one end of the drive assembly frame to transport and accumulate loads in the conveyor zone adjacent the first end section of the conveyor; and a second end section including means for tensioning the endless conveying means, an accumulating take-up assembly frame for supporting the tensioning means and the endless conveying means, means for mounting the take-up assembly frame within the second end section for movement relative to the load-carrying rollers supported thereby, and second independently operable jack means for raising and lowering at least one end of the take-up assembly frame to transport and accumulate loads in the conveyor zone adjacent the second end section of the conveyor.

Other advantages and features of the present invention will become apparent in view of the following detailed description of one embodiment of the invention, which description should be viewed in conjunction with the accompanying drawings, in which:

In general, a live conveyor system is defined as a conveyor having a driving unit for propelling an endless conveying means which, through frictional contact with either a plurality of load-carrying rollers or with a load, transports the load from an upstream end to a downstream end of the conveyor without the assistance of gravity. Furthermore, an accumulating live conveyor system includes means specifically designed to permit loads to remain stationary on the conveyor in particular zones of the conveyor without stopping or interferring with the operation of the driving unit or endless conveying means. With an accumulating live conveyor system, a quantity of loads or articles can be accumulated in a particular zone of the conveyor before being moved further downstream on the conveyor or before being removed from the conveyor. Heretofore in accumulating live conveyor systems of the type defined above, selective accumulation and transportation of the loads could only be accomplished between the ends of the conveyor system because of the inability to raise and lower the driving and take-up units associated with the endless conveying means located at the respective ends of the conveyor.

Figure 1:
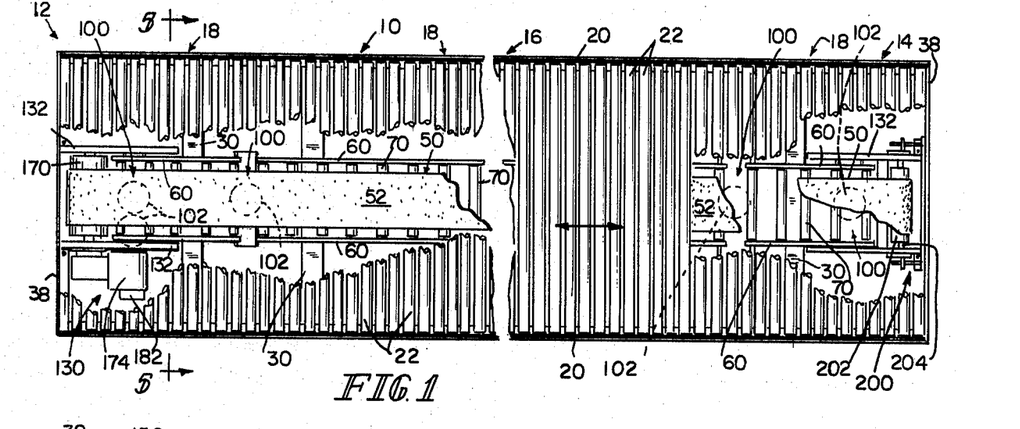
FIG. 1 is a top elevational view, partly broken away, of an accumulating live roller conveyor system including drive and take-up assembly sections constructed according to the present invention.

Illustrated in FIG. 1 is a live roller conveyor system 10 which is power-operated to transport loads or articles (not shown) in a longitudinal direction, as indicated by the arrow, between an upstream zone 12 and a downstream zone 14 over one or more intermediate zones 16 interconnecting the upstream and downstream zones 12, 14. Each zone 12, 14, 16 includes an assembly section 18, and the assembly sections 18 are connected to provide a continuous elongated conveyor system 10. As will be explained in more detail, the conveyor system 10 also includes means specifically designed in accordance with the present invention which permit loads to be accumulated on the conveyor 10 and remain stationary in either the drive, take-up, or intermediate zone 12, 14, or 16, respectively, of the conveyor 10 without interference with the operation of the driving or take-up units.

Referring now to FIGS. 1–5, each of the assembly sections 18 comprising the complete accumulating live roller conveyor system 10 includes a side frame assembly which in general may be any one of a number of side frame assemblies well known in the conveyor art. Illustratively, the side frame assembly disclosed in a copending application entitled "Side Frame Assembly for Roller Conveyor Systems", Ser. No. 135,279, filed Mar. 31, 1980, and assigned to the same assignee as the present invention, is shown and described in conjunction with the improvements of the present invention.

Figure 5:
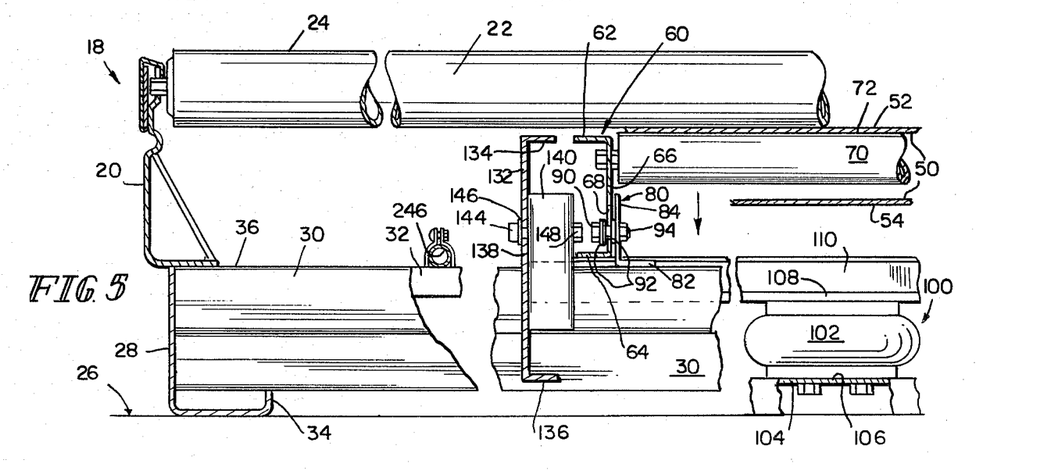
FIG. 5 is a fragmented cross-sectional view, partly broken away, of the drive assembly sections of FIG. 1, illustrated in the drive position, and taken generally along section lines 5—5 of FIG. 1.

Referring more particularly to FIG. 5, the side frame assembly of each section 18 includes two lateral side support members 20 provided in spaced parallel relationship to support a plurality of load-carrying rollers 22 for rotation about transverse axes which are suitably spaced apart and arranged in a common load-transporting array in the longitudinal direction of the conveyor system, as indicated by the arrow in FIG. 1. As best illustrated in FIG. 5, the side support members 20 are rigid profiled upright rails having a generally L-shaped cross section. The top or load-supporting surfaces 24 of the rollers 22 are supported above the upper edge of the support members 20 to facilitate movement of loads on and off of the conveyor system 10.

The two parallel side support members 20 of each assembly section 18 are elevated in spaced relationship to the base or floor surface 26 to which the conveyor system 10 is attached by leg angles 28, that is, legs having an J-shaped cross section. The leg angles 28 associated with one support member 20 are diametrically opposed to the leg angles 28 associated with the other laterally spaced support member 20. The opposed leg angles 28 are then connected by one or more hollow rectangular cross-tie members 30 which fix the two side support members 20 in a predetermined spaced parallel relationship determined by the length of the load-carrying rollers 22.

Secured to selected cross-tie members 30 are conduit support brackets 32 which are generally C-shaped in cross section and approximately 12.00 inches (30.48 cm.) in length. These brackets 32 are employed in a manner to be described, to support and hold electrical and/or fluid conduits (see FIG. 2) in spaced relationship to the base or floor surface 26 so that the area beneath the assembly sections 18 can be kept completely clear.

Continuing to refer particularly to FIG. 5, each leg angle 28 includes a generally upwardly turned lip portion 34. The connecting cross-tie members 30 provide a planar support surface 36 for the side support members 20, and it should be noted that when the cross-tie members 30 are secured to the leg angles 28, they are elevated in spaced relationship to the base or floor surface 26 by the upturned lip portions 34 of the leg angles 28.

Figure 3:
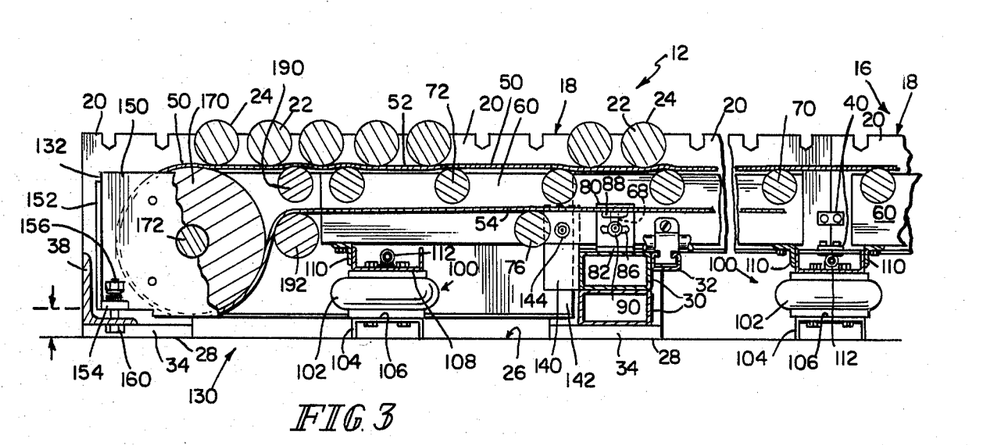
FIG. 3 is a side transverse view, partly broken away and cross-sectioned, of the drive assembly section of FIG. 2 illustrated in the driving position, and taken generally along section lines 3—3 of FIG. 2.
Figure 4:
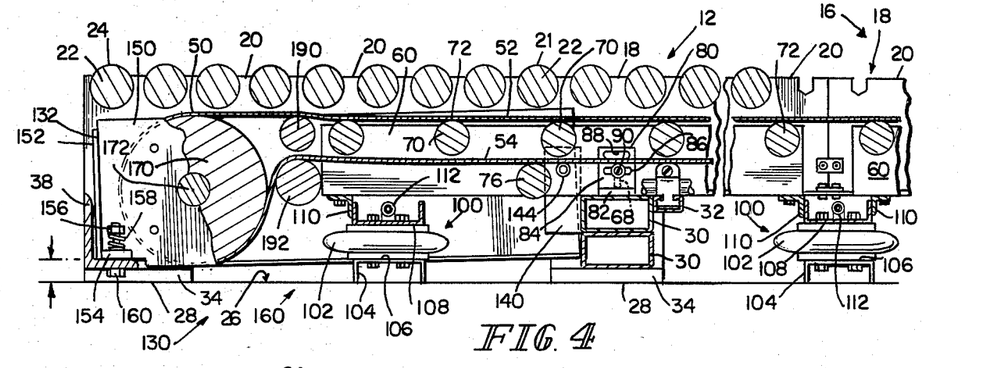
FIG. 4 is a side transverse view, partly broken away and cross-sectioned, of the drive assembly section of FIG. 2 illustrated in the accumulating position, and taken generally along section lines 3—3 of FIG. 2.
Figure 6:
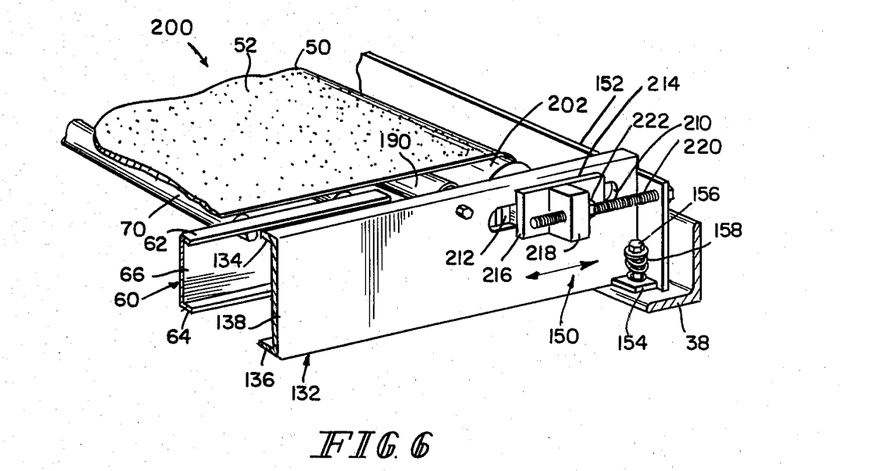
FIG. 6 is a perspective sectional view, partly broken away and cross-sectioned, of the take-up assembly section of the conveyor of FIG. 1.

As can best be seen in FIGS. 3, 4, and 6, the cross-tie member 38 employed at each end of the conveyor system 10 may include an angle bar, that is, a bar having an L-shaped cross section. It can be appreciated that an end cross-tie member 38 does not bear the weight normally experienced by cross-tie members 30 supporting the side support members 20, and therefore the end cross-tie members 38 do not necessarily need to be constructed in the same fashion as the cross-tie members 30.

Figure 2:
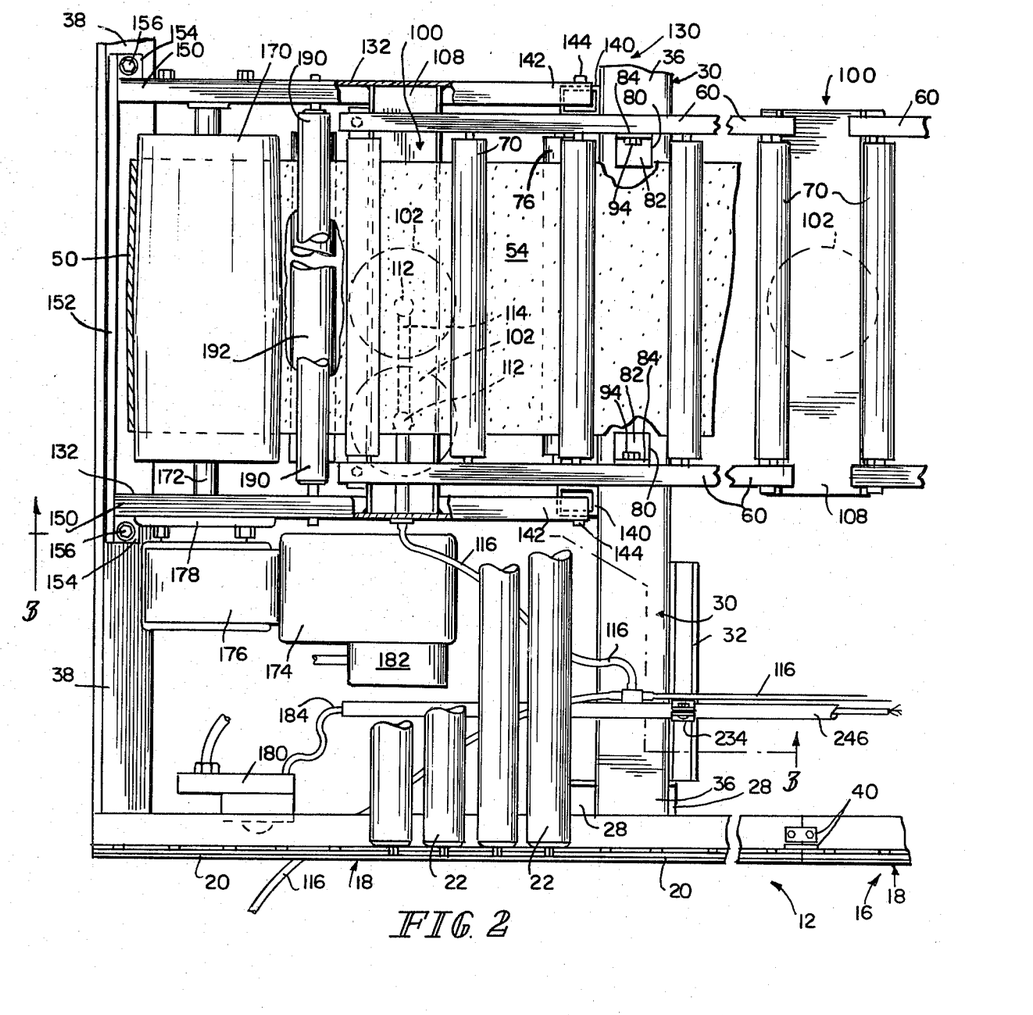
FIG. 2 is a top plan sectional view, partly broken away, of the drive assembly section of the conveyor of FIG. 1.

Each of the assembly sections 18 also includes means for coupling the sections 18 together to form the elongated conveyor system 10. Illustratively, two assembly sections 18 are shown in FIGS. 2, 3, and 4 as being connected together by coupling bars or plates 40 secured to the insides of adjoining side support members 20 by screws or other means.

The live conveyor system 10 is power-driven by an endless driving or conveying means 50 which is held against the load-carrying rollers 22 to propel the rollers 22 through friction contact therewith. Illustratively, the endless conveying means 50 is a flexible belt formed of suitable material so as to develop frictional contact with the peripheral surfaces of the load-carrying rollers 22. It should be noted that the endless conveying means 50 could also be a rope, chain, etc., which is formed of a material similar to that of the belt described above. Furthermore, it is important to note that the improvements of the present invention are also adaptable to live conveyor systems wherein the endless conveying means 50 directly contacts the loads or articles to propel the loads or articles over the load-carrying rollers 22 through frictional contact with the loads.

The endless conveying means 50 has an upper power-delivering or frictional contact pass 52 arranged for frictional driving contact with the load-carrying rollers 22 and a lower return or idle pass 54. As will be described in more detail, the endless conveying means 50 is powered by suitable means for driving the endless conveying means 50 which is located within the drive zone 12 of the conveyor system 10.

As can best be seen again in FIG. 5, each assembly section 18 further includes two elongated lateral inner side support channels 60 which are generally C-shaped in cross section and positioned in spaced parallel relationship to each other between the two outer side support members 20. The inner side support channels or rails 60 include an outwardly and transversely extending upper flange 62, an outwardly and transversely extending lower flange 64, and a rigid upright web portion 66 interconnecting the upper and lower flanges 62, 64. Formed in the upright web portion 66 of each inner side support channel 60 is an elongated slot 68 extending vertically in relation to the transverse axes of the load-carrying rollers 22. In a manner to be explained, these elongated slots 68 in the inner side support channels 60 of each of the assembly sections 18 allow the inner side support channels 60 to be moved vertically relative to the transverse axes of the load-carrying rollers 22.

The inner side support channels 60 rotatably support a plurality of pressure rollers 70 which are rotatable about transverse axes located below and in parallel to the transverse axes of the load-carrying rollers 22. The pressure rollers 70 include upper surfaces 72 which are supported above the upper flange 62 of the channel 60 and which carry the upper frictional driving or contact pass 52 of the endless conveying means 50. In the driving position of an assembly section 18, as best illustrated in FIG. 3, the upper frictional contact pass 52 of the endless conveying means 50 is captured between the pressure rollers 70 and the load-carrying rollers 22 to effect rotation of the load-carrying rollers 22 and propel loads or articles over the conveyor system 10. The inner side support channels 60 also support at least one idler roller 76 below the pressure rollers 70 to carry the lower return or idle pass 54 of the endless conveying means 50 above the plane of the lower flange 64 of the support channels 60. It is important to note that the inner side support channels 60 have a length which is generally less than the length of the outer side support members 20 of each assembly section 18. Furthermore, the length of the inner side support channels 60 and the number of pressure rollers 70 supported by the support channels 60 will be determined by the overall length of the assembly section 18 used in the conveyor system 10. Accordingly, various lengths of assembly sections 18 and inner side support channels 60 can be prefabricated to construct an elongated conveyor system 10 of a desired overall length.

Referring to FIGS. 2 and 5, the inner side support channels 60 are mounted within the assembly section 18 by accumulator mounting brackets 80 which are generally L-shaped in cross section. Each mounting bracket 80 includes an inwardly and transversely extending flange 82 which is secured to the planar support surface 36 of a cross-tie member 30 by screws, welding, or other conventional means. Each mounting bracket 80 also includes an upwardly extending rigid web portion 84. Formed in the web portion 84 are a lower elongated slot 86 and an upper elongated slot 88. Each of the slots 86, 88 extends longitudinally in the direction of the conveyor system 10 and is therefore horizontal relative to the planes of the transverse axes of the load-carrying rollers 22 and the pressure rollers 70. The inner side support channels 60 are connected to the mounting brackets 80 employing either the lower slot 86 or upper slot 88, depending upon the space necessary or available between the cross-tie members 30 and the load-carrying rollers 22, by a bolt 90 which is projected through either the upper or lower slot 86 or 88, respectively, and the vertically extending slot 68 formed in the web portion 66 of the inner side support channels 60. The bolt 90 is loosely secured by washers 92 and a nut 94 to allow upward, downward, and pivotal movement of the inner side support channels 60 relative to the brackets 80. Accordingly, the mounting brackets 80 provide a fulcrum for the raising and lowering of the ends of the inner side support channels 60 by independently operable jack means 100. By raising and lowering the inner side support channels 60, the pressure rollers 70 carrying the upper frictional contact pass 52 of the endless conveying means 50 are correspondingly raised and lowered to engage and disengage, respectively, the endless conveying means 50 and the load-carrying rollers 22 associated with each assembly section 18 of the conveyor system 10 to transport and accumulate loads, respectively, in the various zones 12, 14, 16 of the conveyor 10.

Illustratively, the independently operable jack means 100 include pneumatically inflatable air bags 102 such as, for example, No. 16 Firestone airmounts, which are positioned at the ends of the inner side support channels 60 to coincidentally raise and lower the adjacent ends of the inner side support channels 60 of adjoining assembly sections 18 of selected zones 12, 14, 16. Although not shown, it should be understood that the air bags 102 are connected to an air supply source and the flow of air to each of the bags 102 is independently controllable from a control means (not shown) to selectably raise and lower the inner side support channels 60 of selected assembly sections 18 within the various zones 12, 14, 16 of the conveyor system 10 to remove frictional contact between the endless conveying means 50 and the load-carrying rollers 22 so that the loads remain stationary within the selected zones 12, 14, 16 without interferring with the operation of the endless conveying means 50.

As best illustrated in FIGS. 3-5, each of the jack means 100 includes a downwardly opening base 104 having an upwardly facing surface 106 for supporting and securing the inflatable air bag 102 and an upwardly opening lifting bracket 108 supported by and secured to the air bag 102. As particularly shown in FIG. 2, the lifting bracket 108 and the base 104 are elongated to coincidentally engage the two laterally spaced inner side support channels 60 so that the two support channels 60 are simultaneously correspondingly raised and lowered. Secured to the lifting brackets 108 by screws, welding, or other conventional means are elongated mounting angle brackets or shoulders 110, that is, generally L-shaped in cross section which are coincidentally secured to the corresponding inner support channels 60 of each assembly section 18.

Referring to FIG. 2, each air bag 102 has associated therewith a pneumatic fluid connector 112 and a pneumatic fluid pipe 114 interconnecting the fluid connector 112 to a pneumatic fluid supply line 116.

Referring now to FIGS. 2-5, an accumulating drive assembly 130 according to the present invention is located in the upstream or drive zone 12 of the live conveyor system 10 and includes drive assembly inner frame members 132. The drive assembly inner frame members 132 are generally C-shaped in cross section and, as best illustrated in FIG. 5, include an upper inwardly and transversely extending flange 134 which is generally in the same plane as the upper flange 62 of the inner side support channels 60 when they are raised in the drive position. The drive assembly inner frame members 132 also include a lower inwardly and transversely extending flange 136 and an elongated upright rigid web portion 138 including a plurality of strategically located mounting apertures. Secured to the cross-tie member 30 by screws, welding, or other conventional means, are two upwardly projecting hollow rectangular mounting bars 140 to which are pivotally connected the ends 142 of the drive assembly inner frame members 132. The assembly inner frame members 132 are connected to the mounting bars 140 by bolts 144, washers 146, and nuts 148 so that the end 142 remains stationary relative to the drive assembly section 18 while the other ends 150 of the drive assembly inner frame members 132 are upwardly and downwardly movable. The connection of the assembly inner frame members 132 to the mounting bars 140 therefore serves as a fulcrum for the movement of the drive assembly 130 relative to the load-carrying rollers 22.

Secured to the other ends 150 of the assembly inner frame members 132 is an elongated end panel 152 which extends outwardly beyond the assembly inner frame members 132 to provide a flange 154 for movably coupling the other ends 150 of the assembly inner frame members 132 to the end cross-tie member 38 of the drive assembly section 18. The flanges 154 are connected to the end cross-tie member 38 by a bolt 156 so that the other ends 150 of the assembly inner frame members 132 are biased downwardly against the end cross-tie 38 by compression springs 158 which are captured between the head of the bolt 156 and the flange 154. The bolt 156 is secured to the end cross-tie member 38 by a nut 160 so that the spring 158 compression can be adjusted. It should be noted that the drive/take-up assembly inner frame members 132 can be used in a non-accumulating mode of operation by removing the compression springs 158 and inserting a series of washers between the flange 154 and the end cross-tie member 38 to elevate the ends 150 of the assembly inner frame members 132 so that they are generally within the same plane as the ends 142. Accordingly, the upper frictional contact pass 52 of the endless conveying means 50 would constantly engage the load-carrying rollers 22 adjacent the assembly inner frame members 132 to continuously propel the adjacent load-carrying rollers 22.

In the accumulating mode of operation, described hereinabove, the ends 150 of the assembly inner frame members 132 are raised and lowered into a driving position, as best illustrated in FIG. 3, and an accumulating position, as best illustrated in FIG. 4, respectively. As indicated by the arrows in FIGS. 3 and 4, the ends 150 of the assembly frame members 132 are initially biased downward by springs 158 and are moved upward in response to two jack means 100 secured to the proximal ends of the inner side support channels 60 associated with the drive assembly 130 and to the assembly inner frame members 132 by screws, welding, or other conventional means. Accordingly, inflation of the air bags 102 causes a simultaneous rising of the proximal ends of the inner side support channels 60 and the ends 150 of the assembly inner frame members 132.

Continuing to refer to FIGS. 2, 3, and 4, rotatably mounted to the assembly inner frame members 132 in proximity to the ends 150 thereof is a drive roller 170 mounted to a shaft 172 for rotation therewith which engages the endless conveying means 50 to continuously propel the conveying means 50. One end of the shaft 172 is connected to suitable means 174 for driving the drive roller 170 through a drive train 176. The driving means 174 and drive train 176 are mounted to one of the assembly inner frame members 132 by mounting bracket 178 and are therefore raised and lowered in conjunction with the raising and lowering of the assembly inner frame members 132. Illustratively, a suitable driving means 174 may include a motor of the type manufactured by Eurodrive, Inc., of Troy, Ohio and identified by Model No. DFT80N4.

Associated with the driving means 174 is a switch 180 which is mounted to the stationary outer support members 20, and an electrical control means 182 secured to the driving means 174 which is electrically connected to the switch 180 and to a power supply source (not shown) by an electrical conduit 184.

Also included in the accumulating drive assembly 130 and mounted for rotation to the assembly inner frame members 132 in proximity to the drive roller 170 are two drive control rollers 190, 192. Control roller 190 serves in the same capacity as the pressure rollers 70 supported by the inner side support channels 60, and in fact supports and carries the upper frictional contact pass 52 of the endless conveying means 50. As best illustrated in FIGS. 3 and 4, the control roller 192 also serves in the same capacity as the idler rollers 76 supported by the inner side support channels 60. However, it should be noted that roller 192 has a greater diameter and in its location relative to the drive roller 170 serves to give a higher degree of wrap-around drive roller to increase pull tension of the conveying means 50 and to guide the return pass 54 of the endless conveying means 50 around the drive roller 170 while the remainder of the return pass 54 is maintained within the upper and lower planes of the inner side support channels 60 by idler rollers 76. As illustrated in FIGS. 3 and 4, control rollers 190, 192 are simultaneously raised and lowered with the pressure rollers 70 and idler roller 76 supported by the inner side support channels 60 in response to operation of the air bags 102. Because of the weight of the driving means 174, two air bags 102 are employed in the accumulating drive assembly 130 and one of the air bags 102 is located in proximity to the assembly inner frame member 132 to which the driving means 174 is mounted to assist in raising the assembly frame members 132.

Figure 7:
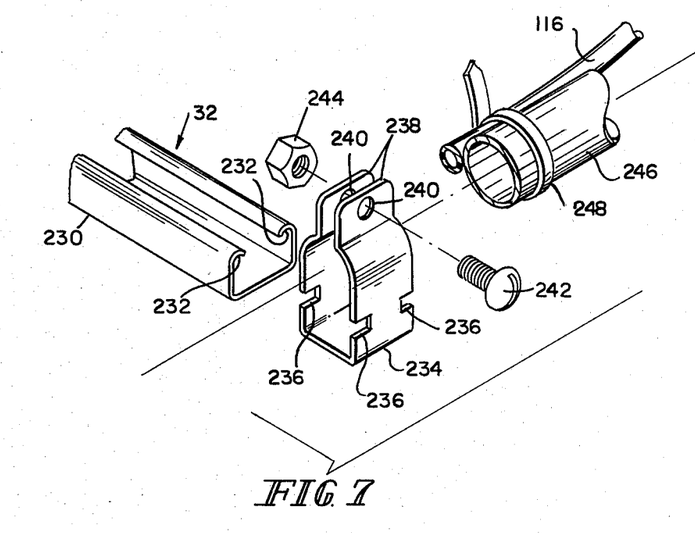
FIG. 7 is an exploded fragmentary view of a portion of the drive and take-up assembly sections of FIGS. 1–6.

Referring now to FIG. 6, an accumulating take-up assembly 200 according to the present invention is substantially identical to the accumulating drive assembly 130 described above. By comparing FIG. 6 to FIGS. 2, 3, and 4, it can be appreciated that the construction of the take-up assembly 200 is identical to the drive assembly 130 except for the deletion of one control roller 192, the replacement of the drive roller 170 with an adjustable tensioning roller 202, and the addition of various means for adjusting the longitudinal position of the tensioning roller 202 to vary the tension in the endless conveying means 50. Accordingly, a single assembly section 18 constructed according to the present invention can be used as either an accumulating drive assembly 130 or an accumulating take-up assembly 200 with relatively minor modifications. In FIG. 7, parts similar to those of the accumulating drive assembly 130 described above are identified with corresponding reference numerals and therefore illustrate the similarities between the accumulating drive assembly 130 and the accumulating take-up assembly 200.

Formed in the assembly inner frame members 132 of the take-up assembly 200 in proximity to the end plate 152 are two elongated longitudinally extending slots 210. The ends of the tension roller 202 shaft 204 are rotatably mounted to tension-roller carriages 212 which are slidably carried within the elongated slots 210 so that the tension roller 202 may be longitudinally adjusted to increase or decrease the tension of the endless conveying means 50. Means 214 for adjusting the longitudinal position of the tension roller 202 include generally T-shaped in cross section mounting plates 216 which are secured to the tension-roller carriages by screws, welding, or other conventional means exterior to the assembly inner frame members 132. The mounting plates 216 each have a flange 218 extending transversely to the longitudinal direction of the conveyor system 10 which is generally parallel and in spaced relation to the end panel 152. Extending through the end panel 152 and threaded through the flanges 218 are two elongated threaded bolts 220. By turning the bolts 220 located on either side of the assembly inner frame members 132, the tension roller 202 can be adjusted in the longitudinal direction of the conveyor system 10 to adjust the tension of the endless conveying means 50. A nut 222 threaded on each of the bolts 220 is used to fix the location of the tension roller 202 once it has been adjusted for the desired tension of the endless conveying means 50.

Referring now to FIG. 7, the conduit support brackets 32 which are secured to various cross-tie members 30 to carry the pneumatic fluid supply lines 116 and the electrical supply lines 184 (see FIG. 2) include a unistrut channel 230 which is generally C-shaped in cross section. The channel 230 has opposed inturned side flanges 232 for holding a unistrut conduit clamp 234. As best seen in FIG. 7, the conduit clamp 234 includes two pair of opposed notches 236 which receive the inturned side flanges 232 of the channel 230 to hold the clamp 234 in the channel 230.

The conduit clamp 234 includes opposed upwardly projecting sides 238, each of which includes apertures 240 which are aligned to receive a bolt 242. When the bolt is inserted through the apertures 240, a nut 244 may be threaded to the bolt 242 to retain a conduit carrier 246 within the clamp 234. Conduit carrier 246 may include any rigid conduit such as pipe or tubing so that the electrical supply line 184 can be carried within the conduit carrier 246 without itself being clamped or crimped. The fluid supply line 116 may also be carried within the conduit carrier 246 or carried external to the carrier 246 by a conduit-retaining strap 248.

In accordance with this invention, an elongated live conveyor system 10 which includes accumulating drive, take-up, and intermediate assembly sections 18, has a high degree of versatility. For example, the improvements of the present invention allow loads to be selectably and independently accumulated on the conveyor 10 in either the drive zone 12, the take-up zone 14, or any one of the intermediate zones 16 of the conveyor system 10 or any combination thereof. Heretofore, in the type of live conveyor system described above, it has only been possible to selectively accumulate loads in the intermediate zones 16 of the conveyor system 10 because it was not known how the drive and take-up assemblies of the conveyor system could be raised and lowered independent of the intermediate sections of the conveyor to allow accumulation in the drive and take-up zones 12, 14 of the conveyor systems 10. Accordingly, in order to accumulate loads in the drive and take-up zones 12, 14, it was necessary to stop or interfere with the operation of the endless conveying means or the means driving the conveying means. This problem and others are solved by the improvements of the present invention to provide a versatile accumulating live conveyor system 10.

What is claimed is:

1. In an accumulating live roller conveyor system of the type including laterally spaced outer support members for supporting a plurality of load-carrying rollers for rotation about transverse axes which are suitably spaced apart and arranged in a common load-transporting array in the longitudinal direction of the conveyor, an endless driving means for transporting loads over the load-carrying rollers having an upper frictional contact pass for engaging the load-carrying rollers and a lower return pass, a drive assembly section including means for propelling the endless driving means, a take-up assembly section including means for tensioning the endless driving means, at least one intermediate assembly section interconnecting the drive assembly and take-up assembly sections including means for carrying the endless driving means, and means for accumulating loads on the conveyor by raising and lowering the upper frictional contact pass of the endless driving means, the improvement comprising: an accumulating drive assembly including inner frame members for supporting the propelling means and the endless driving means, means for mounting the inner frame members within the drive assembly section of the conveyor for movement relative to the load-carrying rollers, and means for raising and lowering the inner frame members to raise and lower the propelling means and at least a section of the endless driving means and thereby accumulate loads in a conveyor zone corresponding to the drive assembly section of the conveyor.

2. The improvement as recited in claim 1, further comprising an accumulating take-up assembly including inner frame members for supporting the tensioning means and the endless driving means, means for mounting the inner frame members within the take-up assembly section of the conveyor for movement relative to the load-carrying rollers, and means for raising and lowering the inner frame members to raise and lower the tensioning means and at least another section of the endless driving means and thereby accumulate loads in a conveyor zone corresponding to the take-up assembly section of the conveyor.

3. The improvement as recited in claim 2 wherein the accumulating drive assembly and the accumulating take-up assembly are interchangeable.

4. The improvement as recited in claim 2 wherein the intermediate assembly section includes laterally spaced inner support members for supporting said carrying means, said carrying means comprising a plurality of pressure rollers which are suitably spaced apart in the longitudinal direction of the conveyor to carry the endless driving means, means for mounting the inner support members within the intermediate assembly section of the conveyor for movement relative to the load-carrying rollers, and said accumulating means comprising means for raising and lowering the inner support members to raise and lower at least the upper frictional contact pass of the endless driving means and thereby acumulate loads in a conveyor zone corresponding to the intermediate assembly section of the conveyor.

5. The improvement as recited in claim 4 wherein the drive assembly and the take-up assembly each further includes laterally spaced inner support members for supporting a plurality of pressure rollers to carry the endless driving means, and means for mounting the inner support members within the drive assembly and take-up assembly sections of the conveyor for movement relative to the load-carrying rollers.

6. The improvement as recited in claim 5 wherein first ends of the inner support members mounted within the drive assembly section are raised and lowered by the means for raising and lowering the drive assembly inner frame members, and first ends of the inner support members mounted within the take-up assembly section are raised and lowered by the means for raising and lowering the take-up assembly inner frame members.

7. The improvement as recited in claim 2 wherein the means for mounting the drive assembly inner frame members within the drive assembly section includes means for pivotally coupling first ends of the drive assembly inner frame members to the outer support members to provide a fulcrum for movement of second ends of the drive assembly inner frame members relative to the load-carrying rollers.

8. The improvement as recited in claim 7 wherein the propelling means includes a drive roller and a power source for rotating the drive roller supported in proximity to the second ends of the drive assembly inner frame members, and the drive assembly further includes at least one pressure roller supported by the inner frame members to carry the upper frictional contact pass of the endless driving means, and an idler roller supported by the inner frame members to carry the lower return pass of the endless driving means.

9. The improvement as recited in claim 7 wherein the means for mounting the take-up assembly inner frame members within the take-up assembly section includes means for pivotally coupling first ends of the take-up assembly inner frame members to the outer support members to provide a fulcrum for movement of second ends of the take-up assembly inner frame members relative to the load-carrying rollers.

10. The improvment as recited in claim 9 wherein the tensioning means includes an adjustable tension roller for maintaining proper tension in the endless driving means supported in proximity to the second ends of the take-up assembly inner frame members and the take-up assembly further includes at least one pressure roller supported by the inner frame members to carry the upper frictional contact pass of the endless driving means.

11. An accumulating live roller conveyor, comprising laterally spaced outer support members for supporting a plurality of load-carrying rollers for rotation about transverse axes which are suitably spaced and arranged in a common load-transporting array in the longitudinal direction of the conveyor; an endless conveying means having an upper power-delivering pass in frictional drive contact with the load-carrying rollers and a lower return pass; a drive assembly section including means for driving the endless conveying means, accumulating drive assembly frame members for supporting the driving means and the endless conveying means, means for coupling the drive assembly frame members to the outer support members for movement relative to the load-carrying rollers, and first independently operable jack means for raising and lowering the drive assembly frame members to raise and lower the driving means and a section of the endless conveying means adjacent the driving means to accumulate loads in a conveyor zone corresponding to the drive section of the conveyor, a take-up assembly section including means for tensioning the endless conveying means, accumulating take-up assembly frame members for supporting the tensioning means and the endless conveying means, means for coupling the take-up assembly frame members to the outer support members for movement relative to the load-carrying rollers, and second independently operable jack means for raising and lowering the take-up assembly frame members to raise and lower the tensioning means and a section of the endless conveying means adjacent the tensioning means to accumulate loads in a conveyor zone corresponding to the take-up section of the conveyor; at least one intermediate assembly section interconnecting the drive assembly and take-up assembly sections; the drive, take-up, and intermediate assembly sections each including laterally spaced inner support members for supporting a plurality of pressure rollers for rotation about transverse axes which are suitably spaced apart in the longitudinal direction of the conveyor to carry the endless conveying means, means for coupling the inner support members to the outer support members of each section for movement relative to the load-carrying rollers; this independently operable jack means for raising and lowering a first end of the drive assembly inner support members and a first end of the intermediate assembly inner support members; and fourth independently operable jack means for raising and lowering a first end of the take-up assembly inner support members and a second end of the intermediate assembly inner support members to raise and lower at least the upper power-delivering pass of the endless conveying means to accumulate loads in a conveyor zone corresponding to the intermediate section of the conveyor.

12. The conveyor as recited in claim 11 wherein the first jack means simultaneously raises and lowers a second end of the drive assembly inner support members and the drive assembly frame members and the second jack means simultaneously raises and lowers a second end of the take-up assembly inner support members and the take-up assembly frame members to accumulate loads in the conveyor zones corresponding to the drive and take-up assembly sections of the conveyor, respectively.

13. In a live conveyor system of the type including a power-driven endless conveying means having an upper frictional driving pass for engaging a plurality of load-carrying rollers and a lower return pass, means for propelling the conveying means, and means for tensioning the conveying means, an accumulating section comprising laterally spaced outer support members for supporting a plurality of load-carrying rollers for rotation about transverse axes which are suitably spaced apart and arranged in a common load-transporting array in the longitudinal direction of the conveyor, inner frame members for supporting one of the propelling means and the tensioning means, means for mounting the inner frame members to a portion of the outer support members to allow movement of the inner frame members relative to the load-carrying rollers, laterally spaced inner support members for supporting a plurality of pressure rollers for carrying the upper frictional driving pass of the endless conveying means, means for mounting the inner support members to the portion of the outer support members to allow movement of the inner support members relative to the load-carrying rollers independent of the movement of the inner frame members, and jack means for raising and lowering the inner frame members and the inner support members.

14. The assembly as recited in claim 13, further comprising means for connecting the jack means to both the inner frame members and the inner support members to simultaneously raise and lower at least portions of the inner frame and support members.

15. The assembly as recited in claim 14 wherein the inner frame members include two laterally spaced channels having first ends interconnected by an elongated end plate and second ends each pivotally connected to the portion of the outer support members by a mounting bracket.

16. The assembly as recited in claim 15 wherein the inner support members extend longitudinally between the channels of the inner frame members and are pivotally connected to the portion of the outer support members generally intermediate to their respective ends by mounting brackets, and the inner support members rotatably support at least one idler roller for carrying the lower return pass of the conveying means.

17. The assembly as recited in claim 16 wherein the one propelling means and tensioning means is supported by the inner frame members in proximity to the first ends of the channels and is therefore raised and lowered relative to the load-carrying rollers.

18. The assembly as recited in claim 17 wherein the channels of the inner frame members rotatably support at least one pressure roller for carrying the upper frictional drive pass of the conveying means.

19. In a live conveyor system of the type including a power-driven endless conveying means having an upper frictional driving pass and a lower return pass for moving articles over a plurality of rollers between a first end of the conveyor which includes driving means for propelling the conveying means and a second end of the conveyor which includes tensioning means for adjusting the tension of the conveying means, the improvement comprising means for raising and lowering the driving means and a section of the upper frictional driving pass of the conveying means in proximity thereto to selectably accumulate the articles at the first end of the conveyor without interference with the operation of the driving means and the endless conveying means and means for raising and lowering the tensioning means and another section of the upper frictional driving pass of the conveying means in proximity thereto to selectably accumulate the articles at the second end of the conveyor without interference with the operation of the tensioning means and the endless conveying means, the two raisng and lowering means being independently controllable to cause the articles to remain stationary at one of the ends and to continue to move at the other end of the conveyor.

20. In an accumulating live conveyor system of the type including laterally spaced outer support members for supporting a plurality of load-carrying rollers for rotation about transverse axes which are suitably spaced apart and arranged in a common load-transporting array in the longitudinal direction of the conveyor, an endless driving means for transporting loads over the load-carrying rollers having an upper frictional contact pass and a lower return pass, a drive assembly section including means for propelling the endless driving means, a take-up assembly section including means for tensioning the endless driving means, at least one intermediate assembly section interconnecting the drive assembly and take-up assembly sections including means for carrying the endless driving means, and means for accumulating loads on the conveyor by raising and lowering the upper frictional contact pass of the endless driving means, the improvement comprising: an accumulating drive assembly including inner frame members for supporting the propelling means and the endless driving means, means for pivotally mounting the inner frame members within the drive assembly section of the conveyor for pivotal movement relative to the load-carrying rollers, and means for pivotally raising and lowering the inner frame members to raise and lower the propelling means and a section of the endless driving means in proximity to the propelling means and thereby selectively accumulate loads in a conveyor zone corresponding to the drive assembly end of the conveyor.

* * * * *

UNITED STATES PATENT AND TRADEMARK OFFICE
CERTIFICATE OF CORRECTION

PATENT NO. : 4,293,065
DATED : October 6, 1981
INVENTOR(S) : Thomas A. Dyer and Richard L. Huelster It is certified that error appears in the above-identified patent and that said Letters Patent are hereby corrected as shown below:

Column 12, line 28 (Claim 11, line 43),
"this independently" should be -- third independently --.

Signed and Sealed this

Eighth Day of December 1981

[SEAL]

Attest:

GERALD J. MOSSINGHOFF

Attesting Officer     Commissioner of Patents and Trademarks